United States Patent [19]

Appelt

[11] 3,796,998

[45] Mar. 12, 1974

[54] MOS DYNAMIC MEMORY

[75] Inventor: Daren Ray Appelt, Houston, Tex.

[73] Assignee: Texas Instruments Incorporated, Dallas, Tex.

[22] Filed: Sept. 7, 1971

[21] Appl. No.: 178,103

[52] U.S. Cl. 340/173 DR, 340/173 CA, 340/173 R, 307/238

[51] Int. Cl. ........................ G11c 11/40, G11c 11/24

[58] Field of Search ................. 340/173 R, 173 CA; 317/235 G; 307/238, 279, 304; 320/1

[56] References Cited

UNITED STATES PATENTS

| | | | |
|---|---|---|---|
| 2,902,674 | 9/1959 | Billings et al. | 340/173 R |
| 3,699,544 | 10/1972 | Joynson et al. | 340/173 CA |
| 3,618,053 | 11/1971 | Hudson | 340/173 R |
| 3,387,286 | 6/1968 | Dennard | 340/173 R |

*Primary Examiner*—James W. Moffitt

[57] ABSTRACT

A semiconductor MOS memory system having minimal standby power requirements is described. A sensor cell is fabricated into the MOS memory chip to sense when the MOS memory chip needs to be refreshed. The sensor cell is fabricated so that it will discharge faster than the other memory cells on the MOS memory chip.

3 Claims, 4 Drawing Figures

MOS DYNAMIC MEMORY

This invention is directed to a semiconductor MOS memory system.

Semiconductor MOS memory systems offer significant advantages when compared with the core memories now used for most computer applications. However, core memories offer one significant advantage in that when power is turned off to the memory system, data is retained in the memory. Semiconductor MOS dynamic memories do not inherently have this capability and thus must be provided with a standby power source when normal power is turned off. For practical use of semiconductor memories, the standby power requirements must be minimized and it is preferable that a small rechargeable battery be built into the semiconductor memory system to maintain the memory data in the semiconductor memory for a matter of months.

It is therefore an object of this invention to provide a MOS memory having minimum standby power requirement.

Another object of this invention is to provide a new and improved semiconductor memory that will be able to operate for many months on a small battery.

It is an additional object of this invention to provide a semiconductor MOS memory which is always refreshed at the lowest speed possible reducing the standby power to a minimum.

Figure 1:
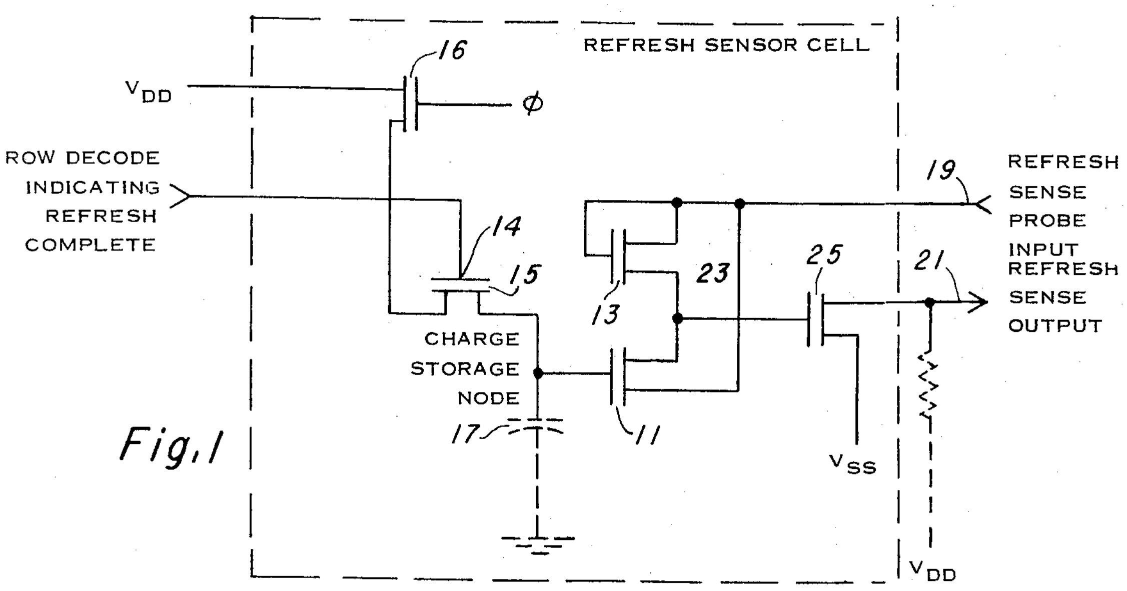
FIG. 1 shows the refresh sensor cell.

Referring now to FIG. 1, a refresh sensor cell is shown. This refresh sensor cell is fabricated on a MOS memory chip. The cell is fabricated so that it will discharge faster than the other memory cells on the MOS memory chip. The circuit consists of MOS transistors 11, 13 and 15. The MOS transistors are commonly called insulated gate field effect transistors. This memory cell in the refresher sensor circuit is fabricated so that it discharges faster than the other memory cells on the MOS chip. This is accomplished by varying the areas of the gates of the three MOS trnsistors 11, 13 and 15. This capacitance is a parasitic capacitance shown as capacitance 17. MOS transistor 25 is added to the refresh sensor circuit and connected to a node 23 between MOS transistors 11 and 13. MOS transistor 25 has a refresh sense output on output terminal 21. A refresh sense strobe input is connected from input terminal 19 to MOS transistors 11 and 13. A refresh input labeled ROW decode indicating refresh complete is applied on input terminal 14 to MOS transistor 15. A supply voltage labeled $V_{DD}$ and clock pulse are applied to MOS transistor 16 and a supply voltage labeled $V_{SS}$ applied to MOS transistor 25.

Figure 2:
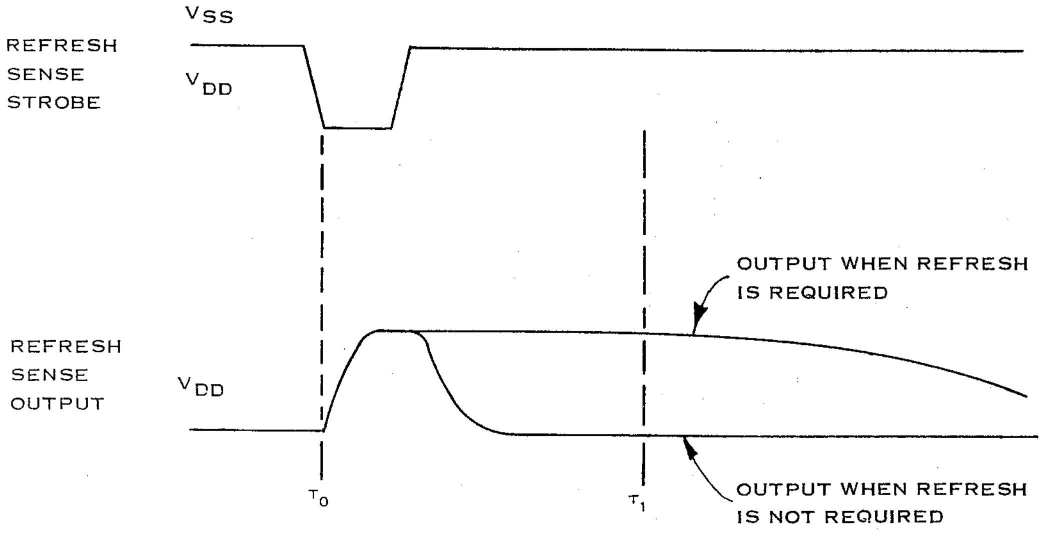
FIG. 2 shows the timing relationship for sensing the refresh sensor cell.

In operating the refresh sensor circuit to control refresh on the MOS memory array, the refresh sensor circuit is refreshed by applying a refresh signal on input terminal 14, refreshing the refresh sensor circuit and charging the refresh sensor circuit to a predetermined capacitance in capacitance 17. This capacitance is fabricated such that it will discharge faster than the actual memory cells in the MOS memory array. The refresh sensor circuit is then sensed on input terminal 19 at a rate faster than the expected required refresh rate. The input on the refresh sense strobe input 19 will charge the refresh sensor cell at a rate depending upon the charge stored in the storage capacitance 17. FIG. 2 shows the refresh sensor timing relationship, with the refresh sense strobe pulse shown at time $t_O$ coming from voltage level $V_{SS}$ to $V_{DD}$ for the pulse interval. The refresh sense output on the output terminal from MOS transistor 25 is shown starting at voltage level $V_{DD}$ at time $t_O$ and rising during the time that the refresh sense strobe pulse is applied on input terminal 19. The output on output terminal 21 is generated whether or not refresh is required. If the charge stored on capacitance 17 is above the predetermined threshold, then no refresh is required in the refresh sensor cell and the output from output terminal 21 will decline back to the supply voltage level $V_{DD}$ before time $t_1$ is reached. If the charge on capacitance 17 has declined below the predetermined threshold, the output on output terminal 21 will not decline and will remain at the level shown at time $t_1$ indicating that refresh is required of the refresh sensor circuit. The sampling at time $t_1$ as shown in FIG. 2 by sampling output terminal 21 indicates refresh is required, since the capacitance in the refresh sensor cell has discharged faster than the other memory cells in the memory array.

At the same time that the refresh sensor circuit is refreshed, the other memory cells in the memory array are also refreshed.

As the refresh sensor is integrated directly into the memory circuit, it will track the memory characteristics exactly. This will ensure that there will be precise compensation for temperature and manufacturing variations. With the refresh sensor circuit on the memory chip itself, the memory is always refreshed at the lowest speed possible thus reducing standby power to the minimum.

If the refresh sense output is on at time $t_1$, refresh is carried out and the expected refresh rate is increased. If the refresh sense output at time $t_1$ off, indicating that refresh is not required, refresh is carried out and the expected refresh rate is decreased. In operation the refresh sense strobe is pulsed at approximately the required refresh rate and then varied according to the results of the sampling.

After the expected refresh rate has increased or decreased, another refresh sense strobe is generated at the new expected refresh rate to again sense the refresh requirements. In this way the refresh rate is adjusted to track the requirements of the memory temperature and other operating conditions are varying. The optimum refresh rate for minimum power requirements is thus achieved for all memory devices in all operating conditions of the memory system.

Figure 3:
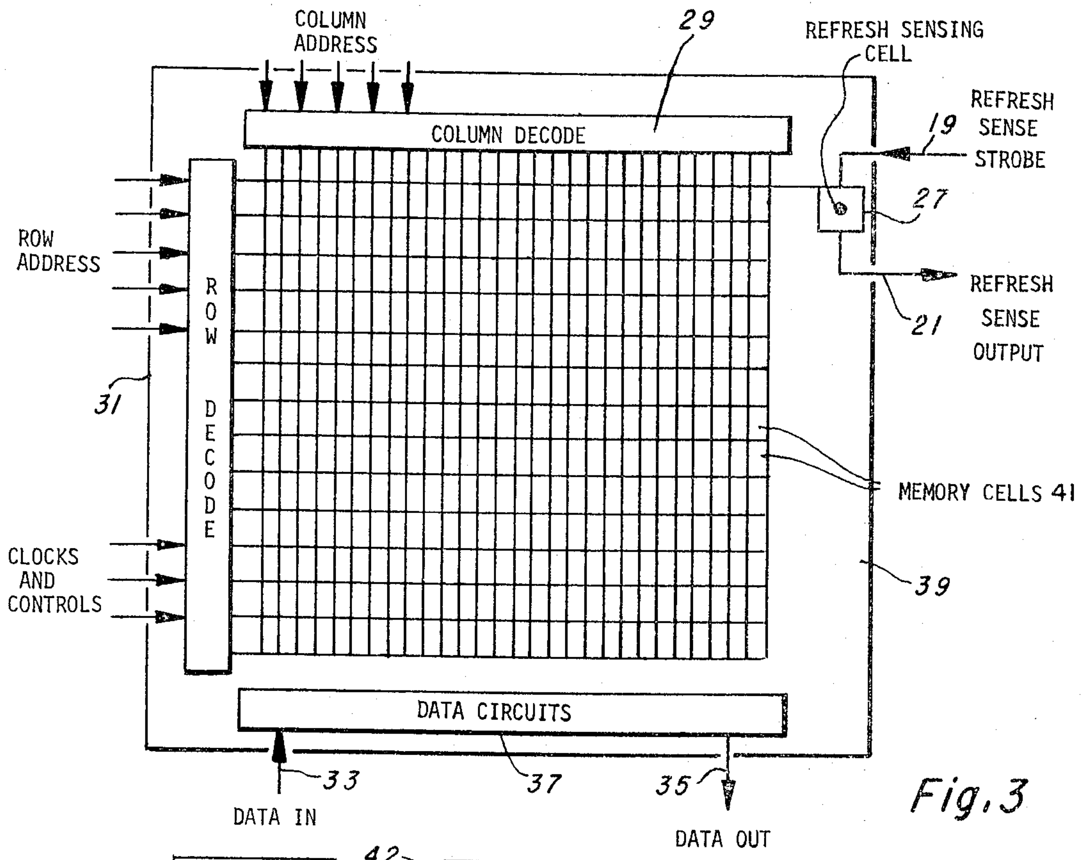
FIG. 3 shows a MOS dynamic memory chip constructed according to this invention.

Referring now to FIG. 3, a MOS dynamic memory chip with refresh sensing is shown with the refresh sensing cell shown and described with relation to FIG. 1 shown as refresh sensing cell 27. The refresh sensing cell 27 has a refresh strobe input on terminal 19 and a refresh sense output on terminal 21. The column addresses are applied to the column decode 29 and the row addresses are applied to the row and decode circuit 31 with clocks and control signals applied to the row and decode circuit 31. The data in is supplied to input terminal 33 to the data circuits 37 with the data taken out on output 35. Data is stored on the memory chip 39 with memory cells at the intersections of the row decode and column decode lines as shown. The memory cells, such as memory cell 41, are similar to those shown in FIG. 1 except for the fact that there is not a corresponding transistor to transistor 25 and the capacitance of the memory cells is fabricated such that the refresh sensing cell 27 decays faster then the memory cells 41.

Figure 4:
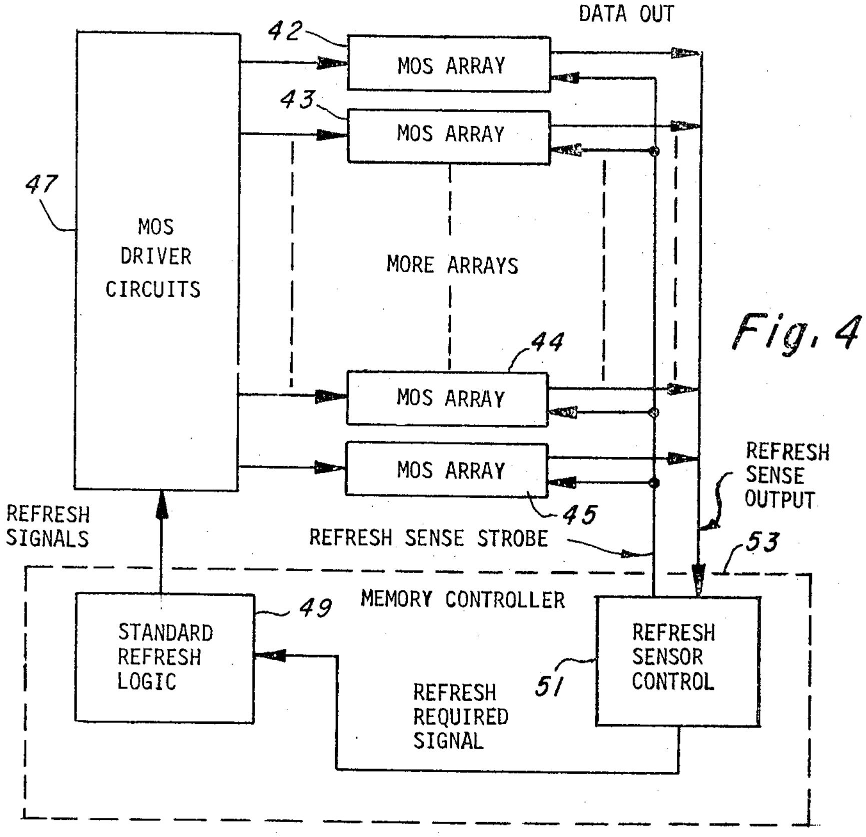
FIG. 4 shows a MOS memory system.

Referring now to FIG. 4 for a description of the MOS memory system using refresh sensing, there are a plurality of MOS dynamic memory arrays 42–45 identical to the MOS dynamic memory array shown in FIG. 3. There are four arrays shown with MOS memory arrays 42–45 shown. There may be additional MOS memory arrays. The MOS memory arrays 42–45 are fabricated on one chip 39 shown in FIG. 3. The MOS memory system uses a MOS driver circuit 47, a standard refresh logic circuit 49 and a refresh sensor control 51. The standard refresh logic circuit 49 and refresh sensor control 51 are in the memory controller 53. The refresh sensing cell 27 shown in FIG. 3 operates in the manner described so that it discharges faster than the other memory cells on the MOS memory chip. The refresh sensor control 51 applies the refresh sense strobe pulse to terminal 19 in the manner described and senses the output on output terminal 21. If the refresh sense output 21 is on at time $t_1$ as shown in FIG. 2, refresh is carried out by the standard refresh logic 49 and the expected refresh rate is increased in the memory controller 53. If the refresh sense output 21 is off at time $t_1$ indicating that refresh is not required, refresh is carried out and the expected refresh rate is decreased. Thus, in operation the refresh sense strobe is pulsed at approximately the required refresh rate, the memory cells are refreshed and then the refresh sense strobe is varied according to the results of the sampling.

What is claimed is:

1. An insulated gate field-effect transistor memory array fabricated on a single chip comprising, a. a plurality of memory cells in said memory array, each said memory cell consisting of a plurality of insulated gate field-effect transistors adapted to store information therein, b. at least one sensor cell fabricated on said single chip with said plurality of memory cells, said sensor cell consisting of a plurality of insulated gate field-effect transistors and fabricated to discharge faster than said memory cells by varying the area of the gates of said insulated field-effect transistors.

2. The insulated gate field effect transistor memory array claimed in claim 1 including means for periodically sensing the discharge of said sensor cell, and means responsive to said sensing means when said sensor cell has discharged below a predetermined level for refreshing said insulated gate field-effect transistor memory array.

3. The insulated gate field-effect transistor memory array claimed in claim 2 including means responsive to the discharge level of said sensor cell for varying the rate at which said memory array is refreshed.

* * * * *